Figure 1:
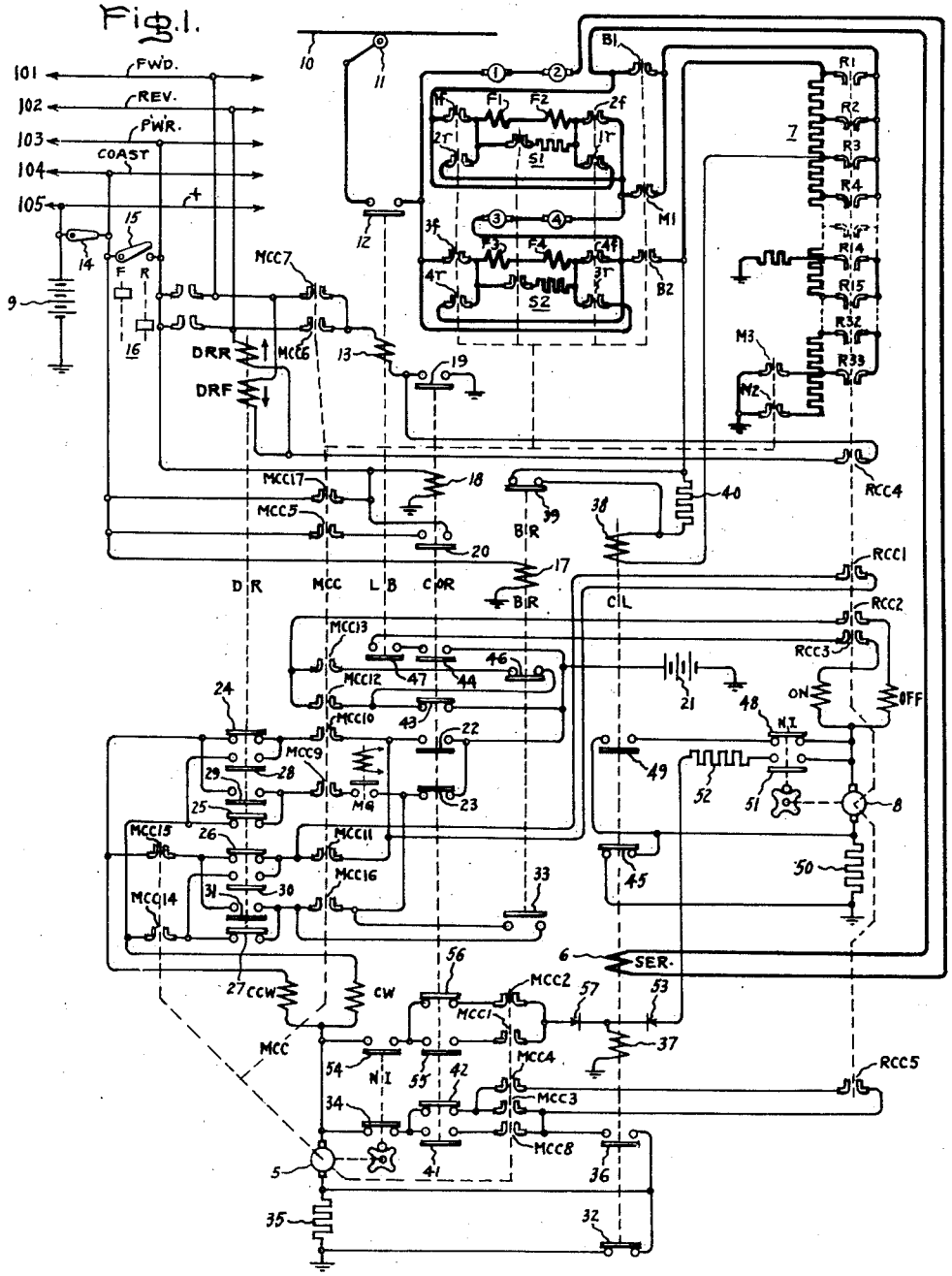

Dec. 22, 1953   I. W. LICHTENFELS   2,663,836
ELECTRIC MOTOR CONTROL SYSTEM
Filed Oct. 26, 1950   3 Sheets-Sheet 1

Inventor:
Ira W. Lichtenfels,
by Ernest C. Britton
His Attorney.

Dec. 22, 1953  I. W. LICHTENFELS  2,663,836
ELECTRIC MOTOR CONTROL SYSTEM
Filed Oct. 26, 1950                                    3 Sheets-Sheet 2

Inventor:
Ira W. Lichtenfels,
by Ernest C. Britton
His Attorney.

Patented Dec. 22, 1953

2,663,836

UNITED STATES PATENT OFFICE 2,663,836

ELECTRIC MOTOR CONTROL SYSTEM

Ira W. Lichtenfels, Harborcreek, Pa., assignor to General Electric Company, a corporation of New York Application October 26, 1950, Serial No. 192,269

9 Claims. (Cl. 318—262)

My invention relates to improvements in control systems and has particular significance in connection with control systems for self-propelled electric vehicles.

In any operator controlled electric passenger vehicle, the problem of the control system is to translate the wishes of the operator into car movement with a degree of smoothness of response sufficient to assure passenger comfort and the long life of associated electrical and mechanical apparatus. The degree of smoothness of response is primarily a problem of timing, the solution of which has heretofore involved the use of many complicated forms of control apparatus which have been expensive to build and hard to maintain. So-called "car electrical failures" are usually mechanical failures of electrical apparatus caused by impact stresses. Anything which can be done to reduce impact stresses by reducing the inertia of moving parts, such as by eliminating the need for a great multiplicity of contactors in which heavy magnetic material is required as a part of each moving contact assembly, is a major item in good mechanical design, especially if at the same time it is made economically feasible to greatly increase the number of functions performed, thereby, for example, allowing a decrease of stepped increment magnitudes resulting in a smoother control. At the same time, a long cherished goal for transportation control apparatus has been standardization and simplification as a means of making a better product at less cost. Heretofore, however, it has not been thought possible to almost completely eliminate the need for heavy contactors or to use common component parts for a wide variety of control systems.

It is an object of the present invention to provide simple and inexpensive means for overcoming the above-mentioned difficulties.

A further object of the present invention is to provide a substantially automatic control system for an electric vehicle in which magnetically operated contactors are reduced to a minimum to provide greater reliability and reduced mechanical and electrical maintenance, while at the same time the number of control functions may with economic justification be greatly increased to allow greater latitude of design and smoothness of performance.

A still further object of the present invention is to provide automatic acceleration control for each of a plurality of electric drive motors which will assure positive sequential operation to afford positive control of the time relationship between opening and closing of main contacts under all conditions of operation while at the same time allowing maximum standardization and minimum expense of installation.

A still further object of the present invention is to provide a novel control system designed to use to best advantage the fundamental advantages of cam operated control by having substantially all contacts used for acceleration, transition, and braking cam operated.

In my copending application S. N. 95,903 filed May 28, 1949, now Patent Number 2,566,898 to Ira W. Lichtenfels and Harold G. Moore issued September 4, 1951, and assigned to the assignee of the present invention, there is described a control system for one of a plurality of like vehicles each adapted to be self powered and driven by a plurality of traction motors and interconnected with the other like vehicles to adapt the same for common master control, with the control system for each vehicle comprising a single electric motor operated controller adapted to actuate cam contacts for progressively shunting out sections of a series resistance bank for said motors. In some applications the system described in said application has certain disadvantages in that there are still required a great number of solenoid operated contactors such as for affecting transition and setting up the braking circuits.

Among the means employed in the embodiment herein illustrated and described are, for each of a plurality of articulated vehicles, duplicate pilot motors neither requiring mechanical positioning and with one adapted to drive a controller having cam operated contacts which control the traction motor power circuits (thereby assuring positive electrical and mechanical interlock) and the other adapted to drive a controller having main fingers operating both in motoring and in braking to provide a plurality of resistance steps. Thus many troublesome contactor interlocks are eliminated because there are a minimum of solenoid operated contactors, and consequently timing of electrical response is improved, maintenance is reduced, major overhaul need be less frequent, and the equipment is less expensive to install and maintain than existing equipments adapted to perform the same or fewer functions and using a multiplicity of contactors each involving "bounce" in contact closing and possible contact erosion and welding.

Figure 2:
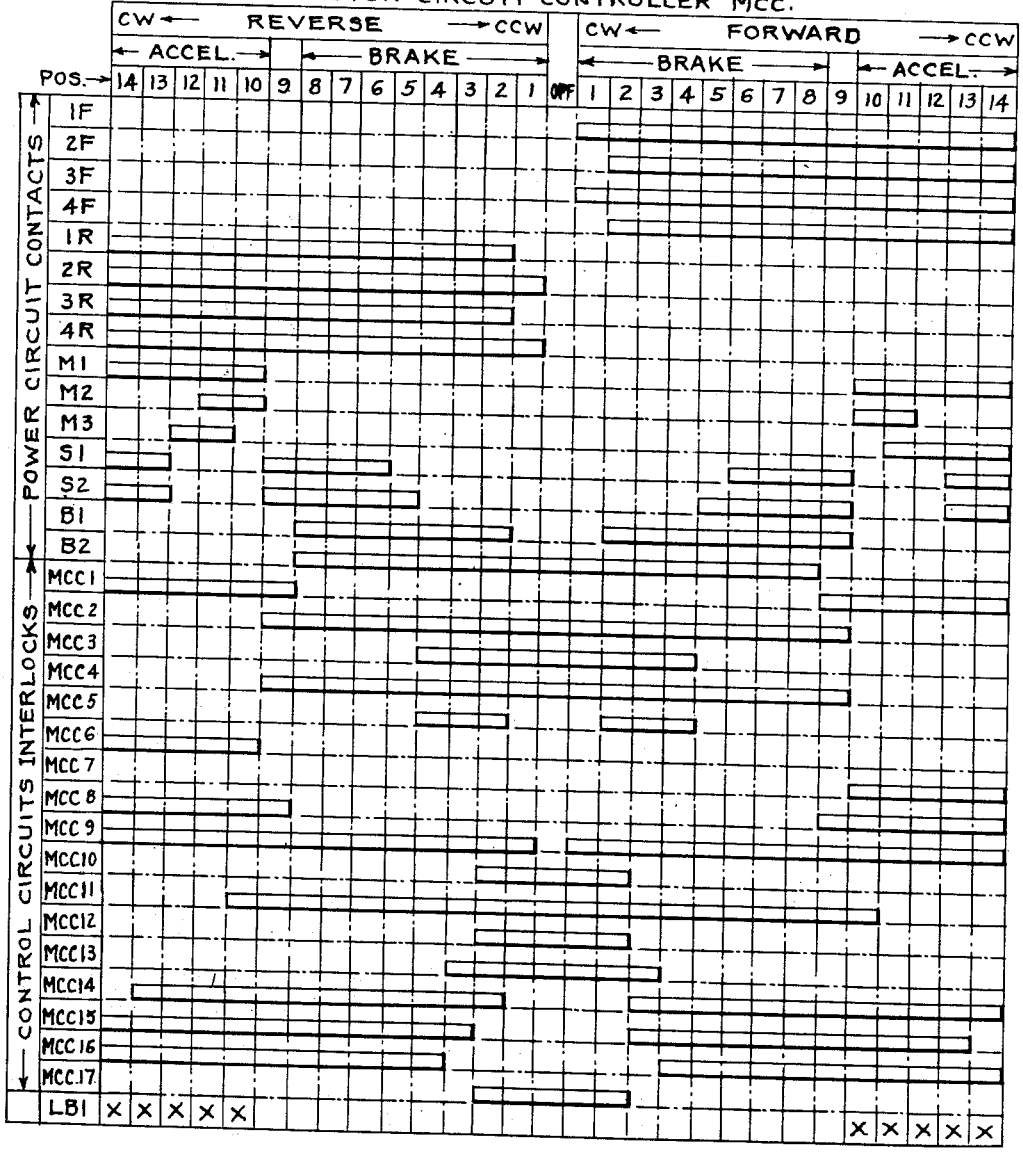
Figure 3:
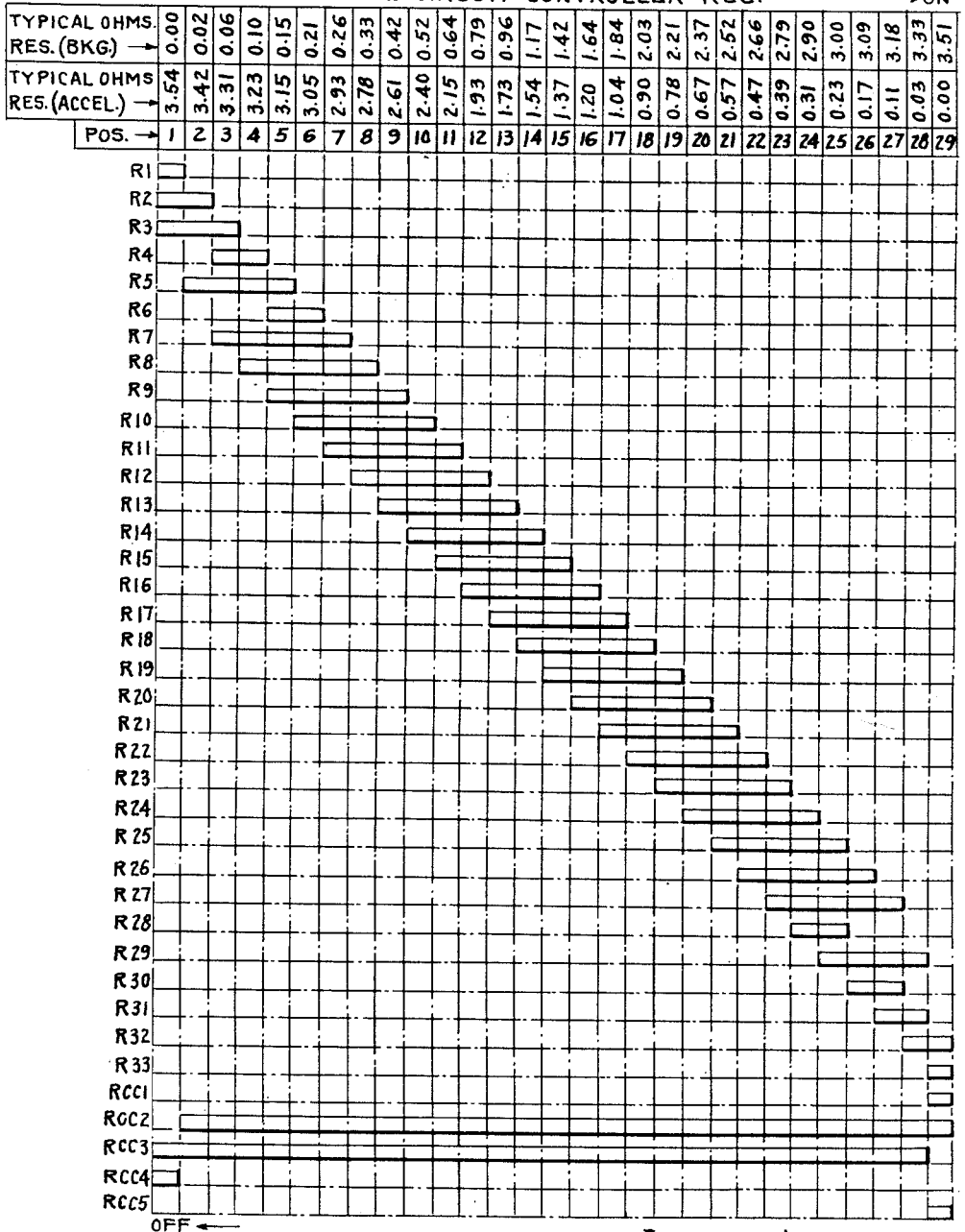

Other objects and advantages will become apparent and my invention will be better understood from consideration of the following description taken in connection with the accompanying drawing in which Fig. 1 is a schematic representation of power and control circuits of one vehicle adapted to be connected in tandem with similar vehicles to form a multi-unit train of vehicles each subject to supervisory control from any one of said vehicles; Fig. 2 is a diagrammatic representation of acceleration and braking sequences of the motor circuit controller MCC of Fig. 1; and Fig. 3 is a diagrammatic representation of acceleration and braking sequences of the resistance circuit controller RCC of Fig. 1.

Referring now to Fig. 1, the control system is illustrated as applied to a plurality of traction motors of which 1 and 2 are permanently connected in series, and 3 and 4 are permanently connected in series and the series pairs thereby defined are adapted to be paralleled for motoring or each series pair is alternately connected in series with the armatures of the other series pair for braking. Each motor is provided with a series type field winding F1—F4, respectively. Conventional forward and reverse magnetic contactors are replaced by cam operated forward contacts, 1f—4f, and reverse contacts 1r—4r with these forward and reverse contacts adapted to be operated by a motor circuit controller (MCC) driven by a pilot motor 5, either directly or indirectly (as through gears).

Power is derived from any suitable source such as a third rail or overhead trolley wire 10 through a collector 11 and the power circuits have voltage applied when a line breaker LB contact 12 is closed due to energization of the LB contactor coil 13. The power circuit may be traced from LB contact 12 to armature of motor 1, motor 2, to a series coil 6 of a current limit relay CL, and (assuming the circuits are set up for motoring and for vehicle forward operation) through contact 1f to field F1, field F2, contact 2f, and (with motoring called for rather than braking) through an MCC cam operated motoring contact M1, through an accelerating resistance bank indicated generally at 7 to ground. Meanwhile a parallel circuit is provided through 3f, F3, F4, 4f, armature 3, armature 4, M1, resistance bank 7, to ground. The resistance bank is adapted to be progressively shorted out by a plurality of 33 resistance shunting contacts R1—R33 inclusive, of which, for simplicity, only about 8 are shown on the drawing. In the illustrated embodiment the amount of resistance bank 7 which is in the circuit at any moment is also determined by position of MCC cam operated contacts M2 and M3. The resistance contacts R1—R33 are cam operated by a resistance circuit controller (RCC) pilot motor 8, the operation of which (like that of motor 5) is determined by operation of current limit relay CL and by other factors as hereinafter more fully explained.

As will hereinafter be more fully explained with reference to the control circuits of Fig. 1, and as will be apparent by reference to the sequence chart of Fig. 2, during braking of the vehicle LB is open, as are also M1—M3, but MCC cam operated contacts B1 and B2 are closed and a circuit may be traced from armature 1, through armature 2, series coil 6, through B1, through appropriate R1—R33 contacts to include an appropriate portion of resistance bank 7 (as hereinafter more fully explained), through MCC contact B2, and (assuming the circuits are set up for vehicle forward motion) through contact 4f, field F4, field F3, contact 3f, back to armature 1. Thus, the voltage generated by motors 1 and 2 acting as generators during braking is used to energize field windings F3 and F4 of the other two motors. Similarly a circuit may be traced to show that the voltage generated by motors 3 and 4 during braking is used to energize fields F1 and F2 of motors 1 and 2.

Field shunting resistances and contacts indicated generally at S1 and S2 may also be provided to be cam operated by MCC pilot motor 5 to provide desirable field shunting for certain of the accelerating steps as well as for certain of the braking steps. Of course it is not necessary to limit the arrangement for each pair of motors to one field shunting contact (and associated resistance) as I have shown, and any number of such contacts and resistances can be used to provide any desired plurality of field shunting steps to take full advantage of as many steps as it seems desirable to provide on the motor circuit controller.

Modern traction power equipments operate at voltages (such as 600 volts) which are too high for control circuit use, and, therefore, it is desirable to provide that control potential be taken from some lower voltage source such as a 32 volt battery 9. Although Fig. 1 is a circuit diagram showing the traction motor circuits and control circuits for only one vehicle or driving unit, it should be understood that with a plurality of such driving units articulated together, control of the entire train is ordinarily initiated from the master controller located at the head end of the leading one of the identical cars although it could be from the master control station in any one of the cars.

The main control train line circuits for interconnection between cars are numbered 101—105 on the drawing, and include the plus line 105 energized from the battery 9 of each car (so that if a car's control power fails for any reason, its control power will be temporarily furnished from the other cars). For any particular car, control voltage is furnished through a control switch 14 (functioning as hereinafter explained as an air brake interlock) to an operator's control station which, as shown in Fig. 1 comprises a throttle switch 15 which, when closed, sets up the circuits in each car for "power on," and which, when open, sets up the circuits in each car for "coast." The operator's control station also comprises a hand operated forward-reverse switch designated generally as 16. The throttle switch 15 functions to energize in proper sequence the three train line wires 101-103 for controlling all power operations of each car, and the reversing switch 16 operates, as hereinafter explained, to set up circuits in each car for forward or reverse operation of the main traction motors. With the instant invention this reversing is done without the use of a conventional "reverser" which as heretofore used is an operating mechanism large enough to handle the full motor current and separately mounted on each of the units adapted for multiple-unit car operation. With the invention, the function of the conventional reverser is built in as an inherent part of the MCC circuit controller. Thus, without the necessity of providing any separate motor circuit current carrying device on each car (other than the MCC controller) there is merely provided a directional relay which as shown in the illustrated embodiment has only control contacts. The directional relay shown has a DRF coil adapted when energized to cause the relay to operate in one direction and a DRR coil adapted when energized to cause the relay to operate in the opposite direction. This directional relay DR is essentially a miniature reverser establishing power connections through the MCC controller so that the vehicle runs in a direction corresponding to the position of the operator's forward and reverse control switch 16.

For each car, train line 105 is energized from battery 9 (of any and all interconnected cars) and control voltage is taken from this train line through the air brake valve interlock 14 (closed unless the air brakes are called for thereby opening this interlock and causing simultaneous dynamic braking action as hereinafter explained). With line 104 energized to differentiate between brake and coast, an operating coil 17 of a brake relay BR is energized in each interconnected car. Train line 104 also energizes the operator's control station on each car and when the throttle switch 15 (on any car) is closed, train line 103 is energized and this energizes a coil 18 of a coast relay COR to differentiate between "power on" and "coast." With 15 closed, when forward and reverse switch 16 (for any car) is placed on "forward," train line 101 is energized and when the reversing switch is placed on "reverse" train line 102 is energized. When train line 101 is energized the DR coil DRF is energized which, as hereinafter more fully explained, causes the MCC motor armature 5 to rotate in such a direction as to eventually close its associated, cam operated interlock contact identified as MCC7 which (as shown in Fig. 2) is closed from 10F through 14F, i. e., the tenth through the fourteenth "forward" position of the MCC controller. MCC7 closing in turn energizes operating coil 13 of the line breaker contactor LB whenever an interlock 19 (or COR) is closed due to COR being energized.

Similarly when the reversing switch 16 is placed in the reverse position, the DRR coil is energized and MCC armature 5 is caused to operate in the opposite direction until MCC6 is closed (in positions 10R to 14R, as shown in Fig. 2) to energize the LB contactor coil 13, if COR is picked up.

To those skilled in the art it will be apparent that with the system provided, great flexibility of control is afforded with a minimum of operating parts. For example, it may be assured that the DRR or DRF coils will not pick up, unless the resistance controller RCC is in proper position to allow acceleration to begin, by placing these DR coils in series with an RCC cam operated interlock such as RCC4 which, as shown in Fig. 3, is closed only at 1RCC (i. e., position 1 of the resistance circuit controller). With the circuit shown the coast relay COR may be picked up even when "power on" switch 15 is not closed, since COR coil 18 may be energized by an MCC cam operated interlock MCC17 (closed from position 2R to position 2F, as indicated in Fig. 2) and kept energized through its own interlock 20 and a series connected interlock MCC5 (closed in "F" and "R" positions 2—4, as indicated in Fig. 2).

Control power for operating the two pilot motors (5 and 8) may be derived, as shown, from a local battery 21. Since for a given direction of vehicle travel it is desired to have the power circuit pilot motor operate the MCC cams through the corresponding sector in one direction for motoring of the vehicle and in the opposite direction for braking or coasting, the MCC pilot motor is energized from battery 21 through either a normally open contact 22 of COR or, alternatively, through a normally closed contact 23 (of COR). The motor circuit controller may be readily provided with a large number of additional cam operated interlocks such as MCC9 (closed through positions 1–14 for both forward and reverse) and MCC10 (closed from position 2 through position 2) to act as limit switches to limit and control the travel of the MCC controller.

The pilot motor 5 is provided with two fields, CW (for clockwise rotation) and CCW (for counterclockwise rotation). With COR picked up, a circuit may be traced from battery 21, through COR contact 22, through limit switch MCC10, and (with DRF energized) through a DR contact 24, to field CCW, through the field to pilot motor armature 5, through the normally closed CL contact 32 to ground, and hence back to the battery 21. Since in case of emergencies, it is often desirable to automatically run the controller to the "off" position and keep it there, I have shown a contact MG which for normal conditions of operation is assumed to be held open. Thus MG relay may be energized (to open) in any suitable manner, for example responsive to a battery charging motor-generator set (not shown) so that failure of battery charging equipment will close MG to by-pass other circuits (as soon as COR is dropped out) and then a circuit may be traced through COR, contact 23, contact MG, limit switch MCC9, DR contact 25, to pilot motor field CW, to cause rotation of the pilot motor toward the "off" position. With the system of the invention, great flexibility of control may be readily achieved by inexpensive duplication of simple parts and, as may often be found desirable, I have indicated parallel circuits for energizing the MCC pilot motor through an MCC limit switch MCC11 (closed from 10 through 10), completing a series circuit (if DRF is energized) through DR interlock 26, and a cam contact MCC15 (closed from 2F through 13F and from 3R through 14R), to energize field CCW and the pilot motor armature, or conversely (when COR is dropped out) through limit switch MCC16 and (with DRF energized) through DR contact 27, and MCC14 to energize field CW and armature 5. It is assumed that energization of field CCW causes the MCC motor to operate counterclockwise (or toward the "power on" position for the forward sector, see Fig. 2) and conversely CW being energized causes the MCC control to rotate clockwise. The directional relay contacts 24–31 are arranged to operate as reversing contacts which remain in either the "R" or "F" position for any given direction of car travel. It will be apparent, then, that coasting relay COR picking up with DR down (forward) energizes CCW field and the pilot motor rotates toward power on position. When COR is dropped out, the pilot motor is reversed and the controller runs towards power off or "brake" position.

Various interlocking between the two pilot motor controllers may be desirable and, in order that the MCC controller will respond to operate field shunting steps S1 and S2 (see Fig. 2) whenever the resistance controller has gone to extreme position to take out all of the accelerating resistance, I have shown the MCC interlock 11 (closed only in positions 10 to 10) bypassed by an interlock RCC1 (see Fig. 1) which is closed in the 29th position of the RCC controller (see Fig. 3).

Shunting the main fields will, of course, further increase vehicle speed.

Braking relay BR is picked up (except when actual braking is called for by opening switch 14). When actual braking is called for, it may be desired to have the MCC controller return quickly to the full off position, and consequently I have shown the interlock MCC16 (closed from 4R to 14R and from 4F to 14F) bypassed by a BR interlock 33 which closes when actual braking is called for.

Each of the pilot motor operated controllers MCC and RCC is furnished with a notch interlock mechanism NI allowing the associated motor armature (5 or 8) to stop only at one of the predetermined positions as numbered in Figs. 2 and 3, so that the motor will only stop at a position at which all contacts are either fully open or fully closed. Thus for the MCC controller the NI ratchet or star wheel directly (or through gearing) driven by armature 5 engages a roller or pawl which opens and closes NI contact 34 to (if the circuit is otherwise complete) short out the armature 5 and quickly stop the pilot motor. This armature shorting circuit is completed to ground through a protective resistor 35 employed in order that the voltage source (i. e. battery 21) will not be directly shorted through the low resistance field CW or CCW. However, the armature 5 shorting circuit through NI contact 34 will not be completed unless limit relay CL is picked up to close its contact 36. As explained in my copending application referred to above, CL will not pick up unless the net effect of all of its operating coils is such as to permit this. As illustrated in Fig. 1 of the present application, CL is provided with a series coil 6 (energized responsive to main motor current), a lift coil 37 (connected across the armatures of each pilot motor in order that CL will operate only when both or one of the pilot motors is energized), and a brake coil 38 arranged across a portion of the main motor braking circuit (as shown across a portion of resistance bank 7). Except when braking is called for (and a BR interlock 39 is open and a series resistance 40 is placed in the circuit of CL brake coil 38) coil 38 will substantially aid the cumulative effect of coils 6 and 37. BR relay, as already explained, differentiates between braking and coasting and, with the arrangement just described, during braking the operation of CL (and consequently the pilot motor armature shunting effect) is slowed down and the operation of pilot armature motor 5 is speeded up to accommodate faster vehicle deceleration.

COR relay, as previously explained, differentiates between "power on" and coast (or brake). COR relay is provided with contacts 41 and 42 arranged in the pilot motor armature 5 short circuiting circuit so that when COR is picked up (power on), the pilot motor stopping circuit is completed only through MCC8 (closed only during acceleration or power positions), or alternately with COR dropped out (for coast or brake) the circuit is completed through MCC3 (closed from 4 through 4) or alternatively through MCC4 (closed in all except the accelerating positions) in series with an interlock RCC5 (closed only at the 29th position).

RCC pilot motor armature 8 turns "off" or "on" also under the control of COR relay which for this purpose is provided with contacts 43 and 44. Thus with COR dropped out (brake or coast) the circuit may be traced from battery 21 through contact 43 to an interlock MCC12 (closed from position 2 through position 2 and provided to prevent running the resistance controller back unless the motor circuit controller is in proper position) and through limit switch RCC2 (closed in all except the first position), to the RCC pilot motor field marked "Off," and then through armature 8 and CL contact 45 to ground. During coasting (when BR is picked up), an alternate circuit around MCC12 is provided through BR contact 46 and MCC13 (closed from 3 through 3).

If "power" is actually called for so that COR is picked up, the circuit may be traced from battery 21 through COR contact 44, and whenever the main connection from trolley to drive motors is completed through LB contact 47, and through RCC3 (closed on all except the last or 29th position) to the field marked "On" (for power) and through the armature of pilot motor 8 and CL contact 45 to ground. The associated notch interlock mechanism NI driven by armature 8 is provided with a contact 48 operating (whenever CL is picked up to close CL contact 49) to short circuit the pilot motor armature 8 through the protective resistor 50. As shown, the same notch interlock is provided with an NI contact 51 connected in series with a resistance 52 and a rectifier 53 for energizing CL lift coil 37 intermittently while the pilot motor is operating. Similarly the other notch interlock which is driven by MCC armature 5 is provided with a contact 54 which is arranged in series with a COR contact 55 (closed during motoring) and a cam contact MCC1 (closed 9 through 14 in both sectors), or alternatively through a COR contact 56 (closed for coast and brake) and MCC contact 2 (closed 9 through 9) and through a rectifier 57 to energize lift coil 37 and thereby stop progression of the motor circuit controller whenever all of the desired conditions are met as herein explained.

In order to understand the operation of this system, it may be assumed that the car has stopped after operation in reverse and it is desired to go forward. Throwing reversing switch 16 opens its R contact and closes its F contact. Nothing happens, however, until power is applied. Applying power, by closing throttle switch 15 energizes forward coil DRF which may be an unlatching coil allowing DR relay to drop out. Closing switch 15 also picked up COR so that a circuit can be traced from battery 21 through COR contact 22, MCC10, DR contact 24, to CCW so that the MCC controller which originally was in the reverse sector now travels counterclockwise or toward the forward sector. MCC 10 maintains this circuit until the controller reaches the number 2 forward position at which point MCC15 takes over. The control is now in the forward sector with the main motor field contacts 1f—4f closed for forward travel. With continued counterclockwise progression in the forward sector with MCC running toward the "power on" or accelerating position, closure of the field shunting contacts S1 and S2 and the braking contacts B1 and B2 (which, for example, are closed going through number 8 position) will have no effect because there is no main motor voltage either generated or applied since the vehicle is stopped and the power contactor LB1 has not yet picked up. In the number 9 position, B2 has just opened to break the braking load circuit and in number 10 position M1 and M2 and LB1 are closed to apply power to the motors through all of the accelerating resistance 7. In going to number 11 position M3 closes acting as a cushioning contactor to provide a smooth transition from "power off" to "full power on but without field shunting or accelerating steps."

Referring to the circuit of the RCC pilot motor, when the MCC controller went through its "0" position MCC12 was closed and the RCC "off" was energized to drive the RCC motor back to its number 1 or starting position. When, later, LB1 is picked up as is COR, the "on" field is energized through RCC3 and RCC progresses cutting out accelerating resistance under control of the current limit relay CL. In the 29th position RCC3 opens the circuit and stops the motor. At this point all accelerating resistance has been cut out and the traction motors 1—4 are across the line first with fields shunted and possibly later with full field depending upon progression of MCC. It will be observed that MCC also progresses under the control of CL and provides field shunting in positions 13 and 14 to provide minimum field strength and maximum speed of the drive motors.

Depending upon direction of pilot motor armature 5 movement, either MCC14 or MCC15 will act as a limit switch to cut off the supply of power to the MCC pilot motor at its extreme limit of travel. It should be observed, however, that as the accelerating positions are reached MCC11 is open so that further progression of the MCC controller toward the on position is held up until RCC1 closes at position 29. Therefore when the RCC controller has just cut out all of the accelerating resistance, the traction motor fields are not yet shunted. This and other features as hereinafter explained assure that the two controllers are never operating simultaneously and that is why they may use a common CL relay to notch up slowly according to existing circuit conditions.

Releasing the power throttle 15 de-energizes LB and COR. COR dropping out runs MCC toward the off or brake position first unshunting the motor fields, then inserting cushioning resistance by opening M3, then opening M1 and M2. MCC retrogresses on to position 8 at which point the braking load circuit is closed through B1 and B2. In order to obtain the full cushioning effect provided for power release it may be found desirable to impart a slight time delay to the opening of LB1 in any conventional manner.

To consider the operation of MCC after power is thus removed, it may be assumed that the transit vehicle is operating at maximum speed. When the braking circuit is closed at position 8, maximum field shunting is obtained (with S1 and S2 closed) so that during coasting the weak traction motor fields will allow sufficient main motor generated current through CL9 coil to cause MCC to notch slowly (by holding up retrogression) through positions 8 to 3 under control of CL. At lower car speeds the control will run more quickly through these positions as insufficient load (i. e. braking) current is available to cause the current limit CL to pick up. When the controller reaches number 4 position, the motors are arranged for full field. Closing of MCC13 (in position 3) starts the pilot motor of the resistance controller RCC which then moves in the "off" or brake direction to gradually cut out braking load resistance under the control of current limit relay CL. When the RCC controller reaches the number 1 position, all resistance is cut out and limit switch RCC2 opens and at this time car speed is (or at least it lies within the province of the designer to have car speed down to) approximately one mile per hour.

As already explained, the notch interlock prevents stopping of either controller except in a definite notch. The operation of either pilot motor may be more readily understood by assuming that the control is notching and the main motor current has just dropped to allow CL to drop out thereby calling for another notch. CL dropping out opens the short circuit across the pilot motor and closes the circuit across the small series resistance (35 or 50) so that the pilot motor has full voltage applied and will start. As the controller advances toward the next notch the notch interlock contact (51 or 53) will close completing a circuit to CL coil 37 so that CL will pick up. About this time the main fingers of the associated controller affect the main motor circuit so that main motor current is increased, but although CL picks up calling for stopping of the pilot motor the latter will not stop until the notch interlock closes. At the same time coil 37 is de-energized although CL may pick up anyway (because of the increased main motor current in series coil 6) so that the pilot motor armature is short circuited to cause a plugging action to quickly stop the pilot motor. Stopping of the motor is hastened by the presence of additional field strength due to shorting out the armature back E. M. F. producing additional current limited only by the small resistor (35 or 50) and the field coil resistance.

The coasting operation is differentiated from the braking operation by the operation of the BR relay and during braking BR contact 33 is closed to take MCC toward position "off" so that the motor fields are unshunted, and BR contact 39 is open so that the CL relay is calibrated to regulate for a smaller number of amperes in the main motor circuits (note that during coasting the BR interlock 39 short circuits resistance 40 in series with the CL brake coil 38).

If it be assumed that the car (or like articulated cars) are coasting, and braking is desired, braking switch 14 is opened, dropping out BR by de-energizing train wire 104. For forward vehicle movement, BR dropping out energizes CW field to allow MCC to move toward number 2 position where it is stopped by limit switch MCC14 or 15 at which point the traction motor field shunting is removed. BR dropping out recalibrates CL for higher braking currents and at the same time MCC12 closing at number 2 position starts the RCC controller.

In going from brake to coast, switch 14 is closed energizing train wire 104, picking up BR and (with MCC17 closed) picking up COR which runs MCC toward the power position until MCC5 opens at number 5 position to deenergize COR. COR dropping out reverses MCC which then returns toward the "off" position under the control of CL. This extra run up to the number 5 position is utilized to provide some field shunting to quickly remove braking effort. MCC continues to retrogress under control of CL until it reaches a normal coasting position at which point it is stopped by one of the limit switches and held in coast position, and the RCC pilot motor is energized to allow normal resistance control progression depending on vehicle speed (through consequent main motor generated armature current) so that the control will always be ready for immediate application of braking proportionate to car speed.

To those skilled in the art it will be apparent that the sequence chart of Fig. 2 and the sequence chart of Fig. 3 show merely developed views, each of a cam arrangement which is generally circular in form. For example, for the MCC controller (Fig. 2) during forward vehicle operation the controller operates in the 1—14 forward sector, and with reverse vehicle operation the controller operates in the 1—14 reverse sector. Midway between sectors is the off position "O" where substantially all main circuits are open. The main contacts identified in Fig. 2 as "power circuit contacts" include the reversing contacts 1f—4f and 1r—4r which reverse the main motor fields. All of the other main circuit cam operated functions are substantially duplicated in both sectors merely by cam contour.

It should be observed that with the system illustrated all of the controls "fail safe" because if the train lines between cars should become disconnected this will automatically force the control into the braking connection.

It will be apparent that with the system of the invention mechanical and electrical interlocking is greatly simplified. For example, with conventional control utilizing a multiplicity of separate solenoid operated contactors, extra electrical or mechanical interlocking has to be provided to prevent power and brake contactors being closed simultaneously. Furthermore, the cam operated control fingers of the invention are more reliable than interlocks attached to power contactors, since there is no bounce in contact closing. Major overhaul of the cam control need be less frequent, the control is less expensive both from the standpoint of manufacture and installation, the control may be expected to require less space for the same functions, and there will be positive sequential operation even when the operator "fans" the controls (because the controller can not stop between notches). In an application of the type described (for example, for the control of articulated self-powered rapid transit cars) the system of the invention has the advantage of maintaining a positive rate of change during accelerating, coasting or braking through a resistance controller (as shown having 33 main fingers) utilizing the same fingers both in motoring and braking. Since a total of 28 steps of resistance are available with the 29 position resistance controller shown, and many additional steps are provided by the other controller with its cushioning and field shunting steps not limited to the one or two field shunting steps shown), a large total number of accelerating and braking or coasting steps are made available by the present invention at relatively low cost.

With the system of the invention there need never be a sharp accentuated change-over from one position to another since it is readily possible to positively provide cushioning between successive functions. For example, in conventional equipments it is customary to provide instantaneous release of maximum dynamic braking thereby causing a jerk in the operation of the vehicle but with the system herein illustrated and described even dynamic brake release is cushioned and this cushioned release is obtained by the circuit controller closing contacts to shunt traction motor exciting fields in going from full brake to power.

With the system of the invention, only one power circuit contactor (LB in the illustrated embodiment) need be used, and since it is the only contactor in the system it is economically feasible to make it very rugged and of high capacity and mechanical strength, although it is obvious that my invention is not to be limited to the exact arrangement shown and if desired, other contactors may also be provided and one or more contactors may be provided with conventional overload trip mechanism (not shown) to provide protection against overload currents. In the illustrated embodiment, directional relay DR, coasting relay COR and braking relay BR are all provided without power circuit coils or contacts and may therefore have identical frame and contact structures to permit maximum standardization. Furthermore, each of the two cam controllers may have the same number of positions (twenty-nine being shown for each) and the same number of contacts, so that their structures can be the same or nearly so. All of the cam operated main circuit contacts can be identical and all of the cam operated control contact assemblies can be identical so that the structures of the controllers can be the same despite their difference in function. It will be readily apparent to those skilled in the art that, compared to contactor controls, the invention allows volume production for varied applications thus resulting in a superior product at lower cost.

There is thus provided a device of the character described capable of meeting the objects hereinabove set forth and wherein two main controllers may be identical, may have duplicate pilot motors, neither requiring mechanical positioning, and whereby many common components can be used in many different schemes of control to great advantage from both a manufacturing and servicing standpoint, both timing and interlocking may be readily built in as functions of controller cam development resulting in increased reliability and smoothness of operation, and whereby duplicate equipments may be readily made sequentially responsive to a single modulating means (such as the CL relay described) regardless of the complexity of predetermined additional requirements.

While I have illustrated and described a particular embodiment of my invention, modifications thereof will occur to those skilled in the art. For example, my invention is not limited to use with vehicles designed for articulation but obviously may be used in a vehicle (such as a trolley bus) which is designed to operate independently of other vehicles. I desire it to be understood, therefore, that my invention is not to be limited to the particular arrangement described and I intend in the appended claims to cover all modifications which do not depart from the spirit and scope of my invention.

What I claim as new and desire to secure by Letters Patent of the United States is:

1. In a control system for a main motor having an armature circuit, a field circuit and a source of power, a resistance bank adapted to carry main motor current, a first controller having first pilot motor driving means and a plurality of cam operated motor circuit contacts including motor circuit contacts adapted to place said armature circuit, said field circuit and said resistance bank in series circuit with said source of power for motoring, and including motor circuit contacts adapted to energize said field circuit and place said armature circuit across said resistance bank for dynamic braking of said main motor, a second controller having second pilot motor driving means and a plurality of cam operated resistance circuit contacts arranged to tap progressive sections of said resistance bank, means for energizing said pilot motors and including supervisory control means for selectively calling for motoring or braking of said main motor, dynamic braking means for each of said pilot motors, a cam driven interlock on said first controller and for selectively applying braking to or interrupting braking of said first pilot motor, a cam driven interlock or said first controller arranged to disconnect said source of power from said main motor circuits, a cam driven interlock on said first controller arranged to limit travel thereof, a cam driven interlock on said first controller arranged to energize said first pilot motor to run said first controller to a predetermined position in case of an emergency, a cam driven interlock on said first controller arranged to energize said first pilot motor to run said first controller to a predetermined position when main motor braking is called for by said supervisory control means, a cam driven interlock on said first controller and arranged to de-energize said first pilot motor responsive to predetermined conditions only during motoring, a cam driven interlock on said first controller and arranged to de-energize said first pilot motor responsive to predetermined conditions only during main motor braking, a cam driven interlock on said first controller and arranged to energize said second pilot motor when said first controller has reached a predetermined position, a cam driven interlock on said first controller and arranged to prevent energization of said second pilot motor to run said second controller in a predetermined direction unless said first controller is in a predetermined position, a cam driven interlock on second controller arranged to de-energize said second pilot motor at one limit of travel of said second controller, a cam driven interlock on second controller arranged to prevent a predetermined direction of travel of said first pilot motor unless said second controller is in a predetermined position, and main motor circuit current responsive means for applying braking to both pilot motors and preventing energization of either of them at predetermined high values of main motor armature current.

2. In a control system for a traction vehicle having at least one traction motor, an accelerating and braking resistance bank for said motor, and two separately operable pilot motor-driven controllers, one of said controllers being operable in both directions from an "off" position and having a plurality of contacts connected in the circuits of said motor, some of said contacts being arranged to connect said motor in a motoring circuit with said resistance bank in predetermined positions of said controller and to connect said motor in a braking circuit with said resistance bank in other predetermined positions of said one controller, other of said contacts being arranged to connect said motor for one direction of rotation when said one controller is operated in one direction from said "off" position and for reverse rotation when said one controller is operated in the other direction from said "off" position, the other of said controllers having contacts arranged to shunt said resistance bank, said one controller having interlock contacts arranged to energize said pilot motor of said other controller and to deenergize said pilot motor of said one controller when said one controller reaches a predetermined position in either direction, said other controller having interlock contacts arranged to again energize said pilot motor of said one controller and to deenergize said pilot motor of said other controller when said other controller has completed shunting said resistance bank whereby only one of said controllers operates at any one time.

3. In a control system for a traction vehicle having at least one traction motor, an accelerating and braking resistance bank for said motor, two separately operable pilot motor-driven controllers, one of said controllers being operable in both directions from an "off" position and having a plurality of contacts connected in the circuits of said motor, some of said contacts being arranged to connect said motor in a motoring circuit with said resistance bank in predetermined positions of said controller and to connect said motor in a braking circuit with said resistance bank in other predetermined positions of said one controller, other of said contacts being arranged to connect said motor for one direction of rotation when said one controller is operated in one direction from said "off" position and for reverse rotation when said one controller is operated in the other direction from said "off" position, the other of said controllers having contacts arranged to shunt said resistance bank, said one controller having interlock contacts arranged to energize said pilot motor of said other controller and to deenergize said pilot motor of said one controller when said one controller reaches a predetermined position in either direction, said other controller having interlock contacts arranged to again energize said pilot motor of said one controller and to deenergize said pilot motor of said other controller when said other controller has completed shunting said resistance bank whereby only one of said controllers operates at any one time, and a current limit relay having an operating coil connected in circuit with said traction motor and contacts arranged to deenergize said pilot motors of both the said controllers responsive to a predetermined traction motor current whereby neither of said controllers will operate unless the traction motor current is below said predetermined value.

4. In a control system for a traction vehicle having at least one traction motor and an accelerating braking resistance bank therefor, a pilot motor-driven circuit controller operable in a plurality of steps in both directions from an "off" position and having a plurality of cam operable contacts connected in the circuits of said motor, some of said contacts being arranged to connect said resistance bank in circuit with said motor to establish a braking circuit in a first predetermined number of steps of said circuit controller in either direction away from said "off" position, other of said contacts being arranged to connect said resistance bank in another circuit with said motor to establish a motoring circuit in a second predetermined number of steps of said circuit controller in either direction beyond said first predetermined steps, still other of said contacts being arranged to shunt the field of said traction motor in certain predetermined steps of said circuit controller in either direction, still other of said contacts being arranged to connect said motor for one direction of rotation when said circuit controller is operated in one direction from said "off" position and for reverse rotation when said circuit controller is operated in the other direction from said "off" position, and a pilot motor-driven resistance controller having contacts arranged to progressively shunt sections of said resistance bank.

5. In a control system for a traction vehicle having at least one traction motor and an accelerating and braking resistance bank therefor, a circuit controller operable in a plurality of steps in both directions from an "off" position and having a plurality of cam operable main contacts connected in the circuits of said motor, some of said contacts being arranged to connect said resistance bank across said motor to establish a braking circuit in a first predetermined number of steps of said circuit controller in either direction away from said "off" position, other of said contacts being arranged to connect said resistance bank in series with said motor to establish a motoring circuit in a second predetermined number of steps of said controller in either direction beyond said first predetermined steps, still other of said contacts being arranged to shunt the fields of said traction motor in certain predetermined steps of said circuit controller in either direction, still other of said contacts being arranged to connect said motor for one direction of rotation when said circuit controller is operated in one direction from said "off" position and for reverse rotation when said circuit controller is operated in the other direction from said "off" position, a first reversible pilot motor connected to operate said circuit controller, a resistance controller having a plurality of cam operable contacts arranged to progressively shunt sections of said resistance bank when said traction motor is connected for motoring and to progressively connect said resistance sections when said traction motor is connected for braking, a second reversible pilot motor connected to operate said resistance controller, cam operable interlock contacts arranged to be operated by said first pilot motor and connected to energize said second pilot motor to operate said resistance controller and to deenergize said first pilot motor to stop said circuit controller when said circuit controller has advanced said first predetermined number of steps in either direction, other cam operable interlock contacts arranged to be operated by said second pilot motor and connected to render ineffective said first interlock contacts to again energize said first pilot motor and to deenergize said second pilot motor when said resistance controller has completed shunting said resistance bank whereby only one of said controllers operates at any time, and a current limit relay having a coil connected in series with said traction motor and contacts arranged to deenergize both said pilot motors responsive to a predetermined traction motor current whereby neither of said controllers will operate when said traction motor current is below a predetermined value.

6. In a control system for a traction vehicle having at least one traction motor and an accelerating and braking resistance bank therefor, a circuit controller operable in a plurality of steps in both directions from an "off" position and having a plurality of cam operable main contacts connected in the circuits of said motor, some of said contacts being arranged to connect said resistance bank across said motor to establish a braking circuit in a first predetermined number of steps of said circuit controller in either direction away from said "off" position, other of said contacts being arranged to connect said resistance bank in series with said motor to establish a motoring circuit in a second predetermined number of steps of said circuit controller in either direction beyond said first predetermined steps, still other of said contacts being arranged to connect said motor for one direction of rotation when said circuit controller is operated in one direction from said "off" position and for reverse rotation when said circuit controller is operated in the other direction from said "off" position, a first reversible pilot motor connected to operate said circuit controller, a resistance controller having a plurality of cam operable contacts arranged to progressively shunt sections of said resistance bank when said traction motor is connected for motoring and to progressively connect said resistance bank when said traction motor is connected for braking, a second reversible pilot motor connected to operate said resistance controller, cam operable interlock contacts arranged to be operated by said first pilot motor and connected to energize said second pilot motor to operate said resistance controller and deenergize said first pilot motor to stop said circuit controller when said circuit controller has advanced said first predetermined number of steps in either direction, cam operable interlock contacts arranged to be operated by said second pilot motor and connected to render ineffective said first interlock contacts to again energize said first pilot motor and to deenergize said second pilot motor when said resistance controller has completed shunting said resistance bank whereby only one of said controllers operates at any time, and still other cam operable interlock contacts arranged to be operated by said first pilot motor and connected to insert additional resistance in said resistance bank at a predetermined step of said circuit controller for cushioning the application of dynamic braking.

7. In a control system for a traction vehicle having at least one traction motor and an accelerating and braking resistance bank therefor, a circuit controller operable in a plurality of steps in both directions from an "off" position and having a plurality of cam operable main contacts connected in the circuits of said motor, some of said contacts being arranged to connect said resistance bank across said motor to establish a braking circuit in a first predetermined number of steps of said circuit controller in either direction away from said "off" position, other of said contacts being arranged to connect said resistance bank in series with said motor to establish a motoring circuit in a second predetermined number of steps of said circuit controller in either direction beyond said first predetermined steps, still other of said contacts being arranged to connect said motor for one direction of rotation when said circuit controller is operated in one direction from said "off" position and for reverse rotation when said circuit controller is operated in the other direction from said "off" position, a first reversible pilot motor connected to operate said circuit controller, a resistance controller having a plurality of cam operable contacts arranged to progressively shunt sections of said resistance bank when said traction motor is connected for motoring and to progressively connect said resistance bank when said traction motor is connected for braking, a second reversible pilot motor connected to operate said resistance controller, cam operable interlock contacts arranged to be operated by said first pilot motor and connected to energize said second pilot motor to operate said resistance controller and deenergize said first pilot motor to stop said circuit controller when said circuit controller has advanced said first predetermined number of steps in either direction, cam operable interlock contacts arranged to be operated by said second pilot motor and connected to render ineffective said first interlock contacts to again energize said first pilot motor and to deenergize said second pilot motor when said resistance controller has completed shunting said resistance bank whereby only one of said controllers operates at any time, a source of control power, directional supervisory control means arranged to selectively connect said first pilot motor to said source of control power for operation in one direction or the other way from said "off" position to control the direction of rotation of said traction motor and direction of movement of said vehicle, braking supervisory control means arranged to bypass certain of said first cam operable interlock contacts for operating said first pilot motor to run said circuit controller toward the "off" position for connecting said traction motor for braking, coasting supervisory control means arranged to connect said first pilot motor for operation in the reverse direction to initiate braking, and still other cam operable interlock contacts arranged to be operated by said first pilot motor and connected to disconnect said coasting connection at a predetermined step of said circuit controller.

8. In a control system for a traction vehicle having at least one traction motor and an accelerating and braking resistance bank therefor, a circuit controller operable in a plurality of steps in both directions from an "off" position and having a plurality of cam operable main contacts connected in the circuits of said motor, some of said contacts being arranged to connect said resistance bank across said motor to establish a braking circuit in a first predetermined number of steps of said circuit controller in either direction away from said "off" position, other of said contacts being arranged to connect said resistance bank in series with said motor to establish a motoring circuit in a second predetermined number of steps of said controller in either direction beyond said first predetermined steps, still other of said contacts being arranged to shunt the fields of said traction motor in certain predetermined steps of said circuit controller in either direction, still other of said contacts being arranged to connect said motor for one direction of rotation when said circuit controller is operated in one direction from said "off" position and for reverse rotation when said circuit controller is operated in the other direction from said "off" position, a first reversible pilot motor connected to operate said circuit controller, a resistance controller having a plurality of cam operable contacts arranged to progressively shunt sections of said resistance bank when said traction motor is connected for motoring and to progressively connect said resistance sections when said traction motor is connected for braking, a second reversible pilot motor connected to operate said resistance controller, cam operable interlock contacts arranged to be operated by said first pilot motor and connected to energize said second pilot motor to operate said resistance controller and to deenergize said first pilot motor to stop said circuit controller when said circuit controller has advanced said first predetermined number of steps in either direction, other cam operable interlock contacts arranged to be operated by said second pilot motor and connected to render ineffective said first interlock contacts to again energize said first pilot motor and to deenergize said second pilot motor when said resistance controller has completed shunting said resistance bank whereby only one of said controllers operates at any time, a current limit relay having a coil connected in series with said traction motor and contacts arranged to deenergize both of said pilot motors responsive to a predetermined traction motor current whereby neither of said controllers will operate unless said traction motor current is below a predeterminated value, still other cam operable interlock contacts arranged to be operated by said first pilot motor and connected to insert additional resistance in said resistance bank at a predetermined step of said circuit controller for cushioning the application of dynamic braking, a source of control power, directional supervisory control means arranged to selectively connect said first pilot motor to said source of control power for operation in one direction or the other away from said "off" position to control the direction of rotation of said traction motor and direction of movement of said vehicle, braking supervisory control means arranged to bypass certain of said first cam operable interlock contacts for operating said first pilot motor to run said circuit controller toward the "off" position for connecting said traction motor for braking, coasting supervisory control means arranged to connect said first pilot motor for operation in the reverse direction to initiate braking, and still other cam operable interlock contacts arranged to be operated by said first pilot motor and connected to disconnect said coasting connection at a predetermined step of said circuit controller.

9. In a control system for a traction vehicle having at least one traction motor and an accelerating and braking resistance bank therefor, a circuit controller operable in a plurality of steps in both directions from an "off" position and having a plurality of cam operable main contacts connected in the circuits of said motor, some of said contacts being arranged to connect said resistance bank across said motor to establish a braking circuit in a first predetermined number of steps of said circuit controller in either direction away from said "off" position, other of said contacts being arranged to connect said resistance bank in series with said motor to establish a motoring circuit in a second predetermined number of steps of said controller in either direction beyond said first predetermined steps, still other of said contacts being arranged to shunt the fields of said traction motor in certain predetermined steps of said circuit controller in either direction, still other of said contacts being arranged to connect said motor for one direction of rotation when said circuit controller is operated in one direction from said "off" position and for reverse rotation when said circuit controller is operated in the other direction from said "off" position, a first reversible pilot motor connected to operate said circuit controller, a resistance controller having a plurality of cam operable contacts arranged to progressively shunt sections of said resistance bank when said traction motor is connected for motoring and to progressively connect said resistance sections when said traction motor is connected for braking, a second reversible pilot motor connected to operate said resistance controller, cam operable interlock contacts arranged to be operated by said first pilot motor and connected to energize said second pilot motor to operate said resistance controller and to deenergize said first pilot motor to stop said circuit controller when said circuit controller has advanced said first predetermined number of steps in either direction, other cam operable interlock contacts arranged to be operated by said second pilot motor and connected to render ineffective said first interlock contacts to again energize said first pilot motor and to deenergize said second pilot motor when said resistance controller has completed shunting said resistance bank whereby only one of said controllers operates at any time, a source of control power, a directional relay having at least one operating coil and contacts arranged in the circuit of said first pilot motor for connecting the same to said source of control power for operation in one direction when said last-named operating coil is energized and for operation in the other direction when said last-named relay operating coil is not energized whereby said circuit controller is operated in one direction or the other away from said "off" position to control the direction of rotation of said traction motor and direction of movement of said vehicle, manually operated switch means for selectively connecting said directional relay operating coil to said source of control power, a braking relay having an operating coil connected for energization from said source of control power and contacts connected to bypass certain of said first cam operable interlock contacts when said braking relay operating coil is not energized for operating said first pilot motor to run said circuit controller toward the "off" position for connecting said traction motor for braking, a coasting relay having an operating coil connected for energization from said source of control power and contacts arranged to connect said first pilot motor for operation in the reverse direction to initiate braking when said coasting relay operating coil is not energized, manually operated switch means for opening the circuits of both of said braking and coasting relay operating coils, manually operated switch means for opening the circuit of said coasting relay operating coil alone, and still other cam operable interlock contacts arranged to be operated by said first pilot motor and connected to disconnect said coasting connection at a predetermined step of said circuit controller.

IRA W. LICHTENFELS.

References Cited in the file of this patent

UNITED STATES PATENTS

| Number | Name | Date |
| --- | --- | --- |
| 1,365,317 | Hall et al. | Jan. 11, 1921 |
| 2,041,580 | Tritle | May 19, 1936 |
| 2,318,330 | Purifoy | May 4, 1943 |
| 2,400,971 | Barclay | May 28, 1946 |
| 2,524,348 | Heidmann | Oct. 3, 1950 |
| 2,538,868 | Heidmann | Jan. 23, 1951 |